United States Patent
Prymak et al.

(10) Patent No.: US 6,906,907 B2
(45) Date of Patent: Jun. 14, 2005

(54) MONOLITHIC MULTI-LAYER CAPACITOR WITH IMPROVED LEAD-OUT STRUCTURE

(75) Inventors: John D. Prymak, Green, SC (US); Michael Randall, Simpsonville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 10 days.

(21) Appl. No.: 10/413,656

(22) Filed: Apr. 15, 2003

(65) Prior Publication Data

US 2004/0207971 A1 Oct. 21, 2004

(51) Int. Cl.[7] .................. H01G 4/228; H01G 4/005; H01G 4/30
(52) U.S. Cl. .................. 361/306.3; 361/303; 361/301.4
(58) Field of Search .................. 361/301.4, 303–305, 361/306.1–306.3, 307, 308.1–308.2, 308.3, 311–313, 309, 321.3

(56) References Cited

U.S. PATENT DOCUMENTS

| | | | | |
|---|---|---|---|---|
| 3,514,678 A | * | 5/1970 | Markarian | ............ 361/303 |
| 4,814,940 A | * | 3/1989 | Horstmann et al. | ......... 361/309 |
| 6,370,010 B1 | * | 4/2002 | Kuroda et al. | ........... 361/306.1 |
| 6,407,904 B1 | * | 6/2002 | Kuroda et al. | .............. 361/303 |
| 6,577,491 B1 | * | 6/2003 | Ohtsuka et al. | .......... 361/306.3 |
| 6,590,762 B2 | * | 7/2003 | Greenwood et al. | ........ 361/523 |

FOREIGN PATENT DOCUMENTS

JP          6-251993     *   9/1994   ............ H01G/4/40

* cited by examiner

*Primary Examiner*—Eric Thomas
(74) *Attorney, Agent, or Firm*—Joseph T. Guy; Nexsen Pruet, LLC.

(57) ABSTRACT

A multi-layer capacitor with reduced ESL and internal electrodes for same. The multi-layer capacitor has a monolithic capacitor body with first polarity external electrodes and second polarity external electrodes on an exterior of the body. A first internal electrode has first diverging lead-out electrodes in electrical contact with the first polarity external electrodes. A second internal electrode has second diverging lead-out electrodes in electrical contact with the second polarity external electrodes. The first internal electrode and the second internal electrode are in parallel spaced-apart relationship with a dielectric there between.

40 Claims, 4 Drawing Sheets

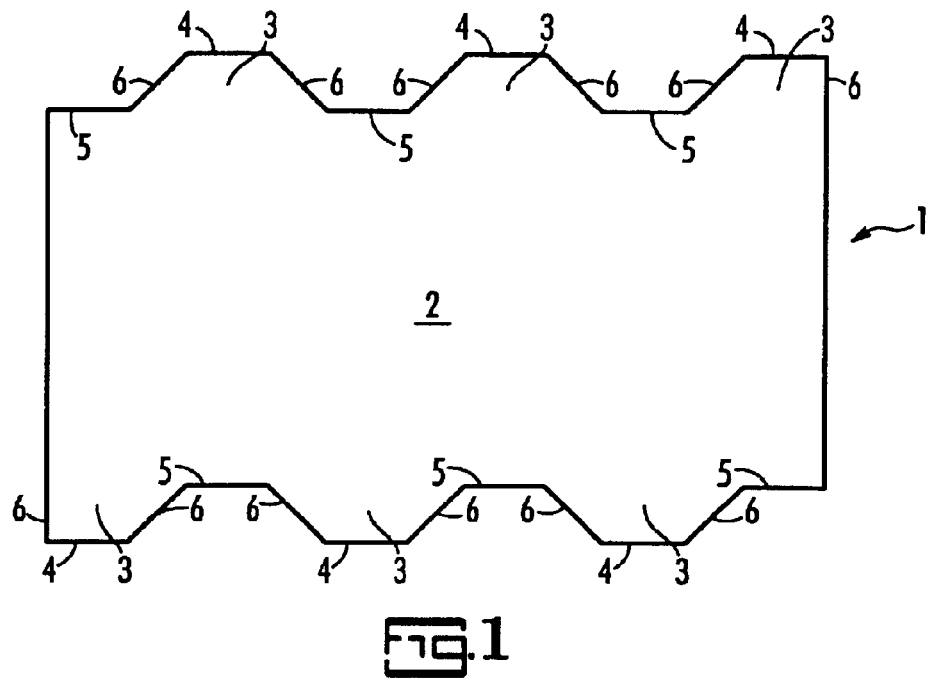
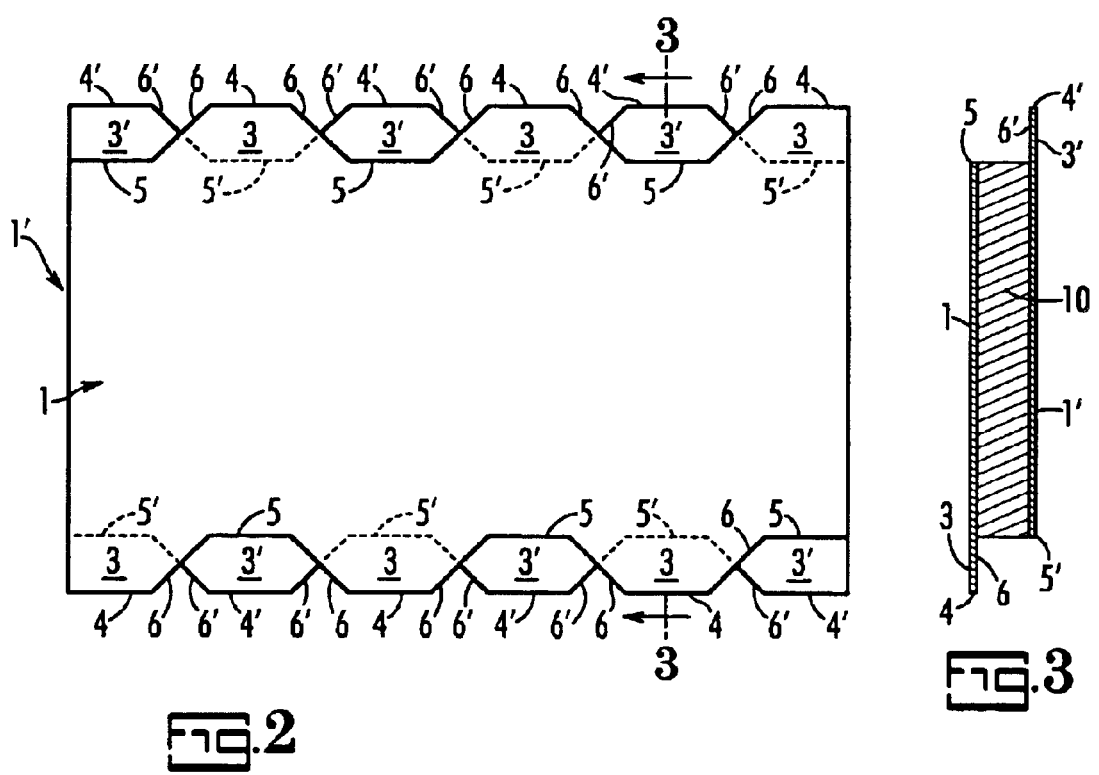

MONOLITHIC MULTI-LAYER CAPACITOR WITH IMPROVED LEAD-OUT STRUCTURE

BACKGROUND OF THE INVENTION

The present invention is related to a monolithic multi-layer capacitor comprising an improved lead-out structure. More specifically, the present invention is related to a capacitor wherein internal electrode plates comprise lead-out electrodes with minimal contribution to equivalent series inductance (ESL).

There has been an ongoing desire for generations to continue the miniaturization of electronic components. Each generation of electronic component allows a higher density of mounted components on a circuit board, or other support, which thereby allows miniaturization of the entire apparatus. As components become smaller, and more closely arranged, cumulative effects began to emerge which previously were of no concern. One such cumulative effect is inductance.

Any flowing current has associated therewith a magnetic field. It is well known that capacitors, particularly multi-layer capacitors, have an equivalent series inductance due, in part, to the current flowing through the lead-out electrodes. There have been many approaches in the art to solving this problem.

The predominant approach to lowering inductance in a capacitor body has been based on the well known physical laws which describe inductance as proportional to length and inversely proportional to width of the charge carrying structure. For example, Naito et al., in U.S. Pat. No. 6,226,169, has defined the aspect ratio, or length divided by width, of lead-out electrodes to be less than 3.0. This approach is limited in the improvement that can be obtained since the advantages are quickly mitigated by structural limitations within the capacitor. Lowering the aspect ratio by widening the lead-out electrodes limits how close the external electrodes can be placed. Lowering the aspect ratio by decreasing the length is limited by the separation between the external electrode and the land of the opposite polarity internal electrode.

Yet another common approach is based on the cancellation, instead of elimination, of inductance. A myriad of examples are available in the art wherein the lead-out electrodes are oriented such that current in adjacent lead-out electrodes is countered thereby cancelling inductance. This approach has met with limited success and as further miniaturization is sought this approach is found to be insufficient. One potential problem is the naturally occurring manufacturing deviations. Capacitors cannot be made that perfectly balance out the current flow to negate ESL. In theory, this technique could provide a capacitor with virtually no ESL however in practice the technique is limited by manufacturing tolerance realities. As further minimization is desired the manufacturing tolerances become even more critical thereby further limiting the ability of cancellation techniques.

Those skilled in the art have been limited to lowering the ESL by lowering the aspect ratio, which is bound by physical constraints, or by cancellation effects, which are bound by manufacturing tolerances. There has yet to be a solution to the reduction in ESL suitable to allow further minimization in capacitors.

BRIEF SUMMARY OF THE INVENTION

It is object of the present invention to provide a capacitor which has minimum ESL.

It is another object of the present invention to provide a capacitor not subject to the physical limits imposed by low aspect ratio lead-out electrodes or the manufacturing tolerance limits imposed by cancellation techniques.

It is another object of the present invention to provide an internal electrode for a capacitor which has inherently lower inductance and can therefore be used in a multi-layer capacitor with superior ESL performance.

A particular feature of the present invention is the simplicity of manufacture since the internal electrodes can be manufactured in a manner similar to prior art capacitors with the only change being formation of an internal electrode with a different shape.

Another particular feature is the ability to further minimize the capacitors of the present invention relative to those capacitors currently provided in the art.

Yet another embodiment is provided in a multi-layer capacitor comprising internal electrodes having diverging lead-out electrodes.

Yet another embodiment is provided in a multi-layer capacitor. The multi-layer capacitor comprises a monolithic capacitor body comprising first polarity external electrodes and second polarity external electrodes on an exterior of the body. A first internal electrode comprises first diverging lead-out electrodes in electrical contact with the first polarity external electrodes. A second internal electrode comprises second diverging lead-out electrodes in electrical contact with the second polarity external electrodes. The first internal electrode and the second internal electrode are in parallel spaced-apart relationship with a dielectric there between.

A particularly preferred embodiment is provided in a multi-layer capacitor. The multi-layer capacitor comprises a monolithic capacitor body comprising first polarity external electrodes and second polarity external electrodes on the exterior of the body. A first internal electrode comprises first lead-out electrodes and lands between the first lead out electrodes. The first lead-out electrodes have a width at the land that is at least 150% of the width of the first lead-out electrodes at the face and the first lead out electrodes are in electrical contact with the first polarity external electrodes. A second internal electrode comprises second lead-out electrodes in electrical contact with the second polarity external electrodes. The first internal electrode and the second internal electrode are in parallel spaced-apart relationship with a dielectric there between.

BRIEF SUMMARY OF THE DRAWINGS

FIG. 1 is an internal electrode of the present invention.

FIG. 2 is a plan view of a pair of internal electrodes of the present invention in operational relationship to form a capacitor unit.

FIG. 3 is a cross-sectional view taken along line 3—3 of FIG. 2.

DETAILED DESCRIPTION OF THE INVENTION

Figure 4:
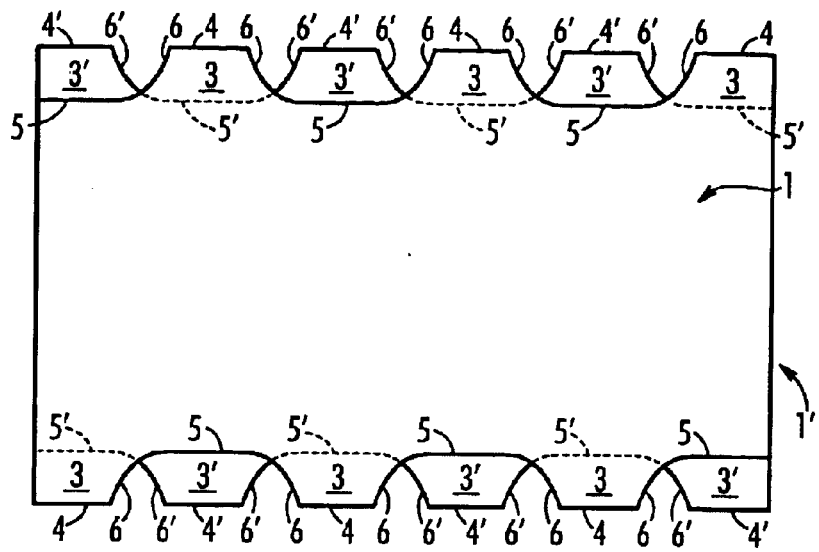
FIG. 4 is a plan view of a pair of internal electrodes of one embodiment of the present invention.

The inventors of the present application have, through diligent research, developed a novel lead-out structure for multi-layer capacitors providing decreased inductance thereby facilitating minimization of capacitors with decreased ESL. In particular, a capacitor comprising lead-out structures with diverging edges has been discovered as an improvement over the art.

The invention will be described with reference to the various figures forming a part of the present application. Similar elements will be numbered accordingly.

An internal electrode of the present invention is illustrated in FIG. 1. In FIG. 1, the internal electrode, generally represented at 1, comprises a planar electrode element, 2, and a multiplicity of lead-out electrodes, 3. Lead-out electrodes are also referred to in the art as tabs. Capacitor structures are well known in the art to comprise an external electrode in electrical contact with the lead-out electrodes. The lead-out electrodes, 3, comprise a contact face, 4, approaching the exterior of the capacitor body for connecting to the external electrode. The lead-out electrodes comprise opposing diverging side edges, 6. It would be understood that the lead-out electrode is preferably integral with the internal electrode. The diverging lead-out electrode terminates at a land, 5. For the purposes of the present invention the lead-out electrode is that portion of the internal electrode protruding beyond the land, 5, and diverging is defined from the contact face toward the land.

The opposing side edges, 6 and 6', diverge thereby forming a lead-out electrode with increasing width as the distance from the contact face, 4, increases. A preferred embodiment is provided in FIG. 1 wherein the lead-out electrode divergences linearly, also referred to as a chamfer. In this embodiment the lead-out electrode approximates a trapezoid. This embodiment is preferred due to the simplicity of manufacture.

A pair of internal electrodes, as in FIG. 1, are illustrated in FIG. 2 in parallel spaced-apart relationship thereby forming a capacitor unit. The internal electrodes are separated by a dielectric not shown in this view. The internal electrodes are preferably identical with one rotated relative to the other such that the lands of one electrode align with the lead-out electrodes of the other electrode as would be realized in the art. For clarity the elements of the second internal electrode will be indicated by primes. First diverging lead-out electrodes, 3, are integral to the first internal electrode, 1, and second diverging lead-out electrodes, 3', are integral to the second internal electrode, 1'. First contact faces, 4, second contact faces, 4', first lands, 5, and second lands, 5', are as described relative to FIG. 1.

In a finished capacitor multiple overlaid internal electrodes would be arranged in a stacked relationship with dielectric between each internal electrode and its nearest neighbour(s). Each set of overlaid first lead-out electrodes would be electrically connected to a common external electrode. Similarly, the overlaid second lead-out electrodes would be electrically connected to a common external electrode. As would be realized to one of ordinary skill in the art the internal electrodes are in a stacked relationship with each internal electrode having opposite polarity to each adjacent internal electrode. The land must be a sufficient length from the external electrode of the opposing polarity to avoid arcing. In practice, the distance between the land and the external electrode is approximated as the length of the lead-out electrode as measured from the land to the contact face.

A cross-sectional view, taken along line 3—3 of FIG. 2, is provided as FIG. 3. The first internal electrode, 1, and second internal electrode, 1', are in parallel spaced-apart relationship separated by a dielectric, 10. The portion of overlapping internal electrode, typically corresponding to the projected surface of the dielectric, is referred to as the capacitor unit. The first lead-out electrode, 1, and second lead-out electrode, 1', extend beyond the capacitor unit for electrical connection to an external electrode as known in the art.

An alternative preferred embodiment is illustrated in FIG. 4. In FIG. 4, the opposing side edges diverge non-linearly. Non-linear divergence can be radial, wherein the divergence follows a circumference of a circle, or it can be exponential. Any continuously diverging configuration is suitable for demonstration of the present invention yet complicated functions are not necessary and merely add manufacturing complexity. For manufacturing simplicity a radial divergence is preferred over an exponential or other non-linear function.

Figure 5:
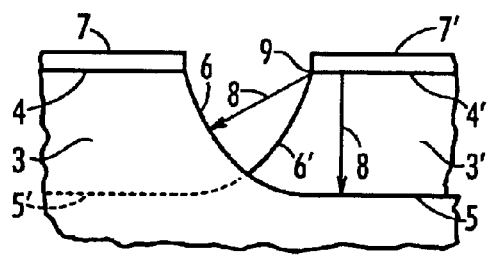
FIG. 5 is a partial view of an embodiment of the present invention.

The minimum distance between internal electrode elements limits the amount that the lead-out electrode can diverge. This will be described with more detail with reference to FIG. 5. The minimum distance between any portion of a first internal electrode and a second internal electrode is that distance below which the charge will arc between the electrodes under intended operating conditions thereby severely limiting the capability of the capacitor. The minimum distance is referred to herein as arc distance. A minimum distance also exists between the external electrode and the internal electrode of opposing polarity. In FIG. 5, a first lead-out electrode, 3, is illustrated in partial view with a first external electrode, 7, in electrical contact therewith. A second lead-out electrode, 3' and second external electrode, 7', are also illustrated. The arc distance, 8, indicated by arrows, is that distance sufficient to avoid arcing of electrical charge under the utilization conditions for the capacitor under consideration. If the separation between the land, 5, and contact face, 4', is less than the arc distance, 8, the capacitor is rendered ineffective due to a loss of capacitance by electrical arcing. In a similar manner, the distance between external electrodes, 7 and 7', must be no smaller than the arc distance, 8. The maximum divergence of the lead-out electrode is restricted to that area which is no less than the arc distance to the external electrode or electrode of opposing polarity. This leads to an optimal lead out divergence structure, for minimization of ESL, of radial. This optimal structure is due to the fixed distance from the closest corner of the nearest neighbour external electrode, 9. The land, 5, is then linear and a fixed distance from the contact face, 4'.

The divergence is preferably sufficient to decrease ESL. The larger the divergence the better the ESL performance up to the limit of arc distance as set forth previously. It is preferred that the divergence be sufficient that the width of the lead-out electrode at the land is at least 110% of the width of the lead-out electrode at the contact face. More preferably, the width of the lead-out electrode at the land is at least 150% of the width of the lead-out electrode at the contact face. Most preferably, the width of the lead-out electrode at the land is at least 200% of the width of the lead-out electrode at the contact face.

Figure 6:
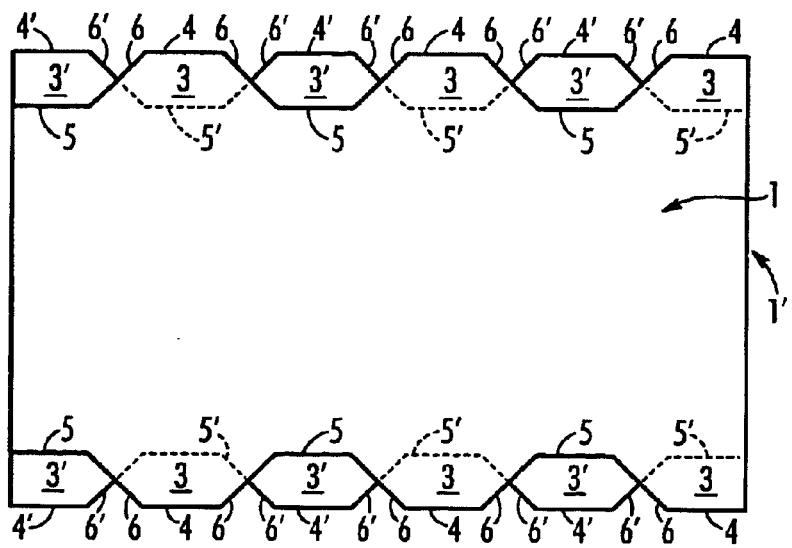
FIG. 6 is a plan view of an embodiment of the present invention.

An embodiment of the present invention is provided in FIG. 6. In FIG. 6, each internal plate has lead-out electrodes across the capacitor from another lead-out electrode. This configuration would yield a capacitor with the same polarity external electrodes across the capacitor. The lead-out electrodes alternate thereby yielding a capacitor with interdigitated alternating polarity external electrodes as would be realized to one of ordinary skill in the art.

Figure 7:
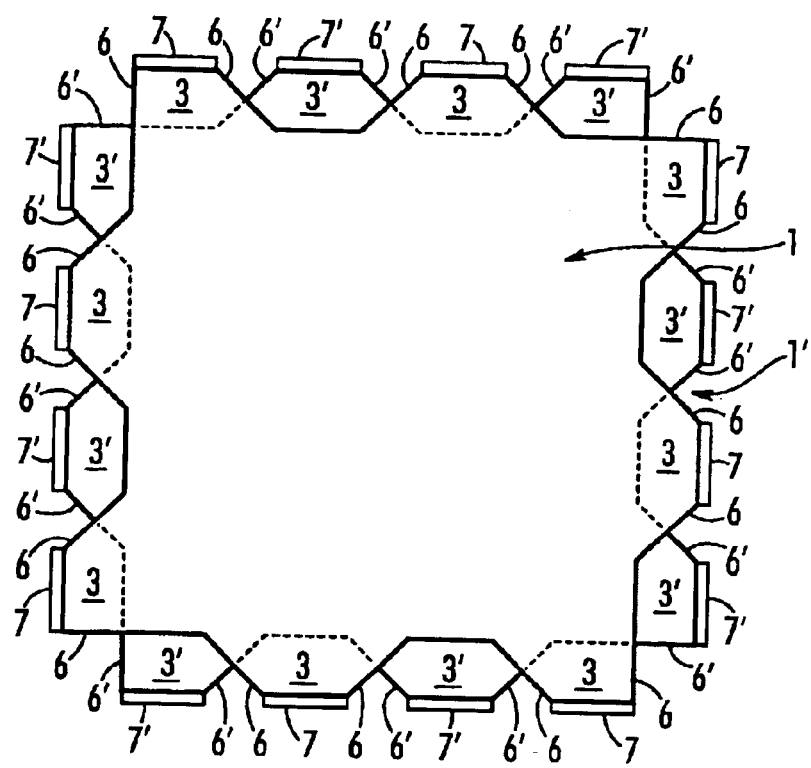
FIG. 7 is a plan view of an embodiment of the present invention.

A preferred embodiment is illustrated in FIG. 7. In FIG. 7, each internal electrode comprises diverging lead-out electrodes. The lead-out electrodes are oriented such that each first polarity lead-out electrode, 3, would be in electrical contact with a first external electrode, 7, at a first contact face, 3. Likewise, each second polarity lead-out electrode, 3', would be in electrical contact with a second external electrode, 7', at a second contact face, 4'. The external electrodes are interdigitated with each first polarity external electrode having a second polarity external electrode on either side thereof. Furthermore, the polarity alternates around the periphery of the capacitor.

Figure 8:
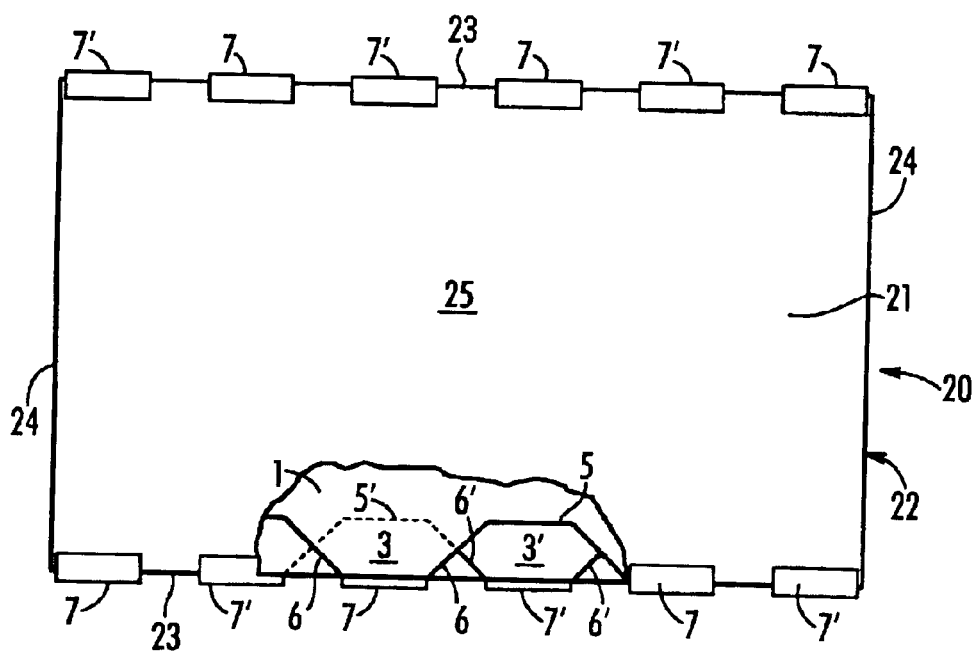
FIG. 8 is a partial cut-away top view of a capacitor comprising capacitor units of FIG. 2.

A partial cut-away view of an embodiment of the present invention is provide in FIG. 8. In FIG. 8, a rectangular capacitor body, generally indicated at 20, comprises an upper surface, 21, and a lower surface, 22, parallel to the upper surface. External electrodes, 7 and 7', along the two parallel longer sides, 23, are in electrical contact with respective lead-out electrodes, 3 and 3', of the internal electrodes, 1 and 1'. In a preferred embodiment, the exterior electrodes are interdigitated with alternating polarity along each side. In a preferred embodiment the external electrodes across the capacitor body have opposite polarity. In the embodiment illustrated the two parallel shorter sides, 24, do not have external electrodes yet external electrodes on the short sides is considered within the teachings of the present invention. The entire capacitor, except for the surface of the external electrodes, is encased in a nonconductive material, 25, or insulator, to form an envelope that electrical charge can neither enter nor escape except through the external electrodes under normal operating conditions.

Figure 9:
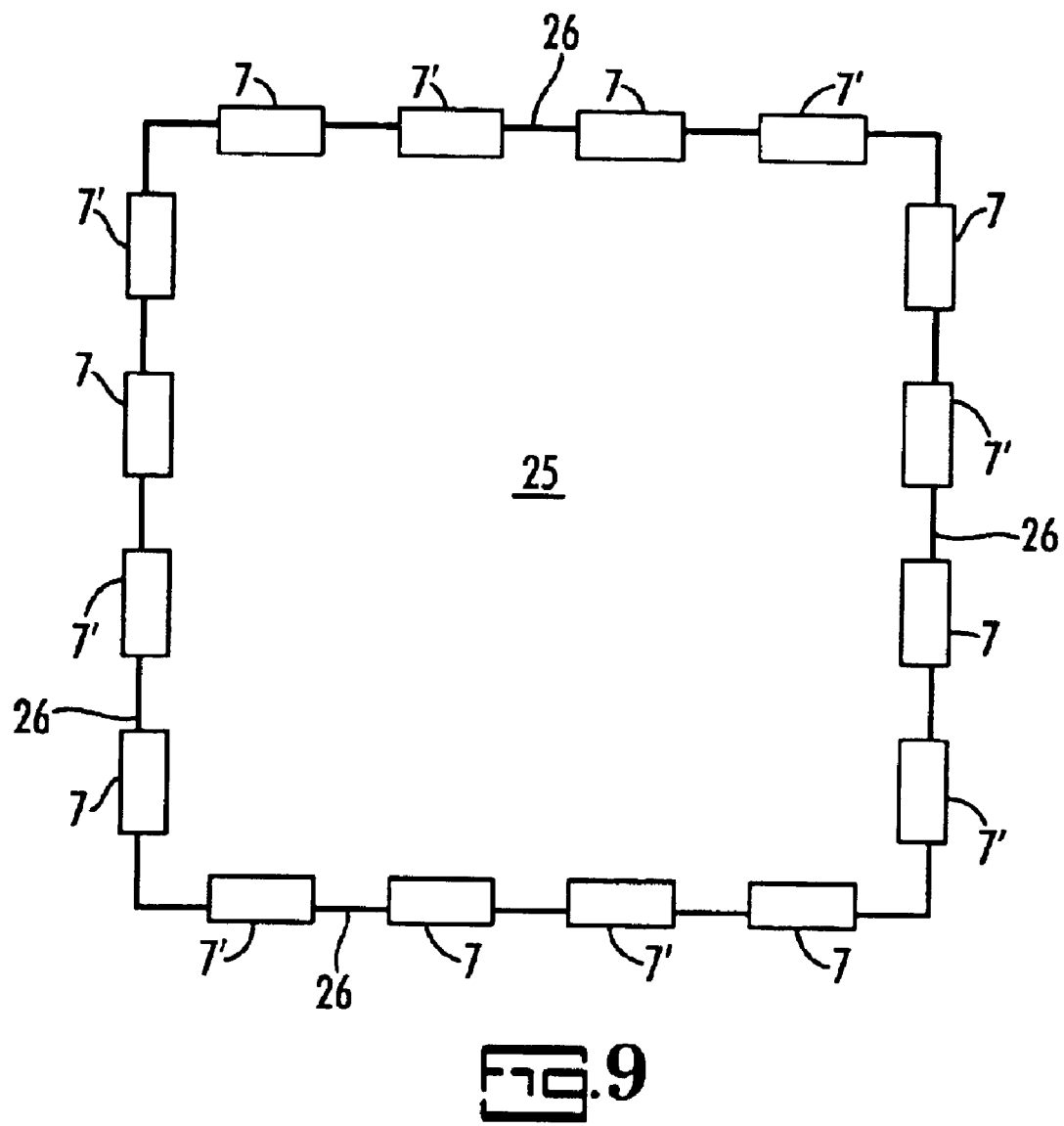
FIG. 9 is a top view of a capacitor comprising capacitor units of FIG. 7.

An embodiment of the present invention is provided in FIG. 9. In FIG. 9, a square capacitor is illustrated comprising interdigitated external electrodes, 7 and 7', of alternating polarity around the periphery. The entire capacitor, except for the external electrodes, is encased in a non-conductor, 25. The four sides, 26, represent the periphery of the capacitor.

The invention has been described with particular emphasis on the preferred embodiments. It would be realized from the teachings herein that other embodiments, alterations, and configurations could be employed without departing from the scope of the invention which is more specifically set forth in the claims which are appended hereto.

What is claimed is:

1. A multi-layer capacitor comprising a capacitor unit and internal electrodes having diverging lead-out electrodes wherein said lead-out electrodes have a non-linear divergence beyond said capacitor unit.

2. A multi-layer capacitor comprising a capacitor unit and internal electrodes having diverging lead-out electrodes beyond said capacitor unit wherein said diverging lead-out electrodes are further than an arc distance from an external electrode of opposite polarity.

3. A multi-layer capacitor comprising internal electrodes having diverging lead-out electrodes wherein said internal electrodes have a land between said diverging lead-out electrodes and said diverging lead-out electrode are integral to said land wherein the width of said diverging lead-out electrodes at said land is at least 110% of the width of said diverging lead-out electrodes at a contact face.

4. The multi-layer capacitor of claim 3 wherein said width of said diverging lead-out electrodes at said land is at least 150% of the width of said diverging lead-out electrodes at said contact face.

5. The multi-layer capacitor of claim 4 wherein said width of said diverging lead-out electrodes at said land is at least 200% of the width of said diverging lead-out electrodes at said contact face.

6. A multi-layer capacitor comprising a capacitor unit and internal electrodes having diverging lead-out electrodes diverge beyond said capacitor unit wherein said capacitor comprises a rectangular capacitor body and external electrodes on the exterior of said capacitor body wherein said external electrodes are in electrical contact with said lead-out electrodes.

7. The multi-layer capacitor of claim 6 wherein said capacitor body is square.

8. A multi-layer capacitor comprising internal electrodes having diverging lead-out electrodes wherein said internal electrodes comprise a first internal electrode and a second internal electrode separated by a dielectric wherein said diverging lead-out electrodes diverge beyond said dielectric.

9. The multi-layer capacitor of claim 8 wherein said first internal electrode has first diverging lead-out electrodes and said second internal electrode has second lead-out electrodes.

10. The multi-layer capacitor of claim 9 wherein each first lead-out electrode of said first lead-out electrodes is in electrical connection with a first external electrode of first external electrodes and each second lead-out electrode of said second lead-out electrodes is in electrical connection with a second external electrode of second external electrodes.

11. The multi-layer capacitor of claim 10 wherein said first external electrodes and said second external electrodes are interdigitated on said capacitor.

12. The multi-layer capacitor of claim 10 wherein said first external electrodes and said second external electrodes alternate around a periphery of said capacitor.

13. A multi-layer capacitor comprising:
   a monolithic capacitor body comprising first polarity external electrodes and second polarity external electrodes on an exterior of said body;
   a first internal electrode comprising first diverging lead-out electrodes wherein said first diverging lead-out electrodes are in contact with said first polarity external electrodes;
   a second internal electrode comprising second diverging lead-out electrodes wherein said second diverging lead-out electrodes are in contact with said second polarity external electrodes;
   said first internal electrode and said second internal electrode are in parallel spaced-apart relationship with a dielectric there between wherein said first diverging lead-out electrodes diverge beyond said dielectric.

14. The multi-layer capacitor of claim 13 wherein said second lead-out electrodes have a non-linear divergence.

15. The multi-layer capacitor of claim 13 wherein said diverging first lead-out electrodes are further than an arc distance from any portion of any one of said second external electrodes.

16. The multi-layer capacitor of claim 13 wherein said capacitor comprises a rectangular capacitor body and first polarity external electrodes on the exterior of said capacitor body wherein said first polarity external electrodes are in electrical contact with said first diverging lead-out electrodes.

17. The multi-layer capacitor of claim 16 wherein said capacitor body is square.

18. The multi-layer capacitor of claim 13 wherein said diverging lead-out electrodes are further than an arc distance from any portion of an external electrode of opposite polarity.

19. The multi-layer capacitor of claim 13 wherein at least one first polarity external electrode of said first polarity external electrodes is across said capacitor body from a second polarity external electrode of said second polarity external electrodes.

20. The multi-layer capacitor of claim 13 wherein at least one first polarity external electrode of said first polarity external electrodes is across said capacitor body from a second polarity external electrode of said second polarity external electrodes.

21. The multi-layer capacitor of claim 13 wherein said first polarity external electrodes and said second polarity external electrodes alternate over at least a portion of said capacitor body.

22. The multi-layer capacitor of claim 21 wherein said first polarity external electrodes and said second polarity external electrodes alternate around a periphery of said capacitor body.

23. A multi-layer capacitor comprising:
   a monolithic capacitor body comprising first polarity external electrodes and second polarity external electrodes on an exterior of said body;
   a first internal electrode comprising first diverging lead-out electrodes wherein said first diverging lead-out electrodes are in contact with said first polarity external electrodes;
   a second internal electrode comprising second diverging lead-out electrodes wherein said second diverging lead-out electrodes are in contact with said second polarity external electrodes;
   said first internal electrode and said second internal electrode are in parallel spaced-apart relationship with a dielectric there between wherein said first lead-out electrodes have a linear divergence beyond said dielectric.

24. A multi-layer capacitor comprising:
   a monolithic capacitor body comprising first polarity external electrodes and second polarity external electrodes on an exterior of said body;
   a first internal electrode comprising first diverging lead-out electrodes wherein said first diverging lead-out electrodes are in contact with said first polarity external electrodes;
   a second internal electrode comprising second diverging lead-out electrodes wherein said second diverging lead-out electrodes are in contact with said second polarity external electrodes;
   said first internal electrode and said second internal electrode are in parallel spaced-apart relationship with a dielectric there between wherein said first internal electrode has a land between said first diverging lead-out electrodes and said first diverging lead-out electrodes are integral to said land wherein the width of said first diverging lead-out electrodes at said land is at least 110% of the width of said first diverging lead-out electrodes at said first external electrode.

25. The multi-layer capacitor of claim 24 wherein said width of said first diverging lead-out electrodes at said land is at least 150% of the width of said first diverging lead-out electrodes at said contact face.

26. The multi-layer capacitor of claim 25 wherein said width of said first diverging lead-out electrodes at said land is at least 200% of the width of said first diverging lead-out electrodes at said contact face.

27. A multi-layer capacitor comprising:
   a monolithic capacitor body comprising first polarity external electrodes and second polarity external electrodes on an exterior of said body;
   a first internal electrode comprising first lead-out electrodes and lands between said first lead out electrodes wherein said first lead-out electrodes have a width at said land that is at least 150% of the width of said first lead-out electrodes at said face and said first lead out electrodes are in electrical contact with said first polarity external electrodes;
   a second internal electrode comprising second lead-out electrodes in contact with said second polarity external electrodes;
   said first internal electrode and said second internal electrode are in parallel spaced-apart relationship with a dielectric there between.

28. The multi-layer capacitor of claim 27 wherein said first polarity external electrodes and said second polarity external electrodes are interdigitated.

29. The multi-layer capacitor of claim 27 wherein said first polarity external electrodes and said second external polarity electrodes alternate around at least a portion of a periphery of said capacitor body.

30. The multi-layer capacitor of claim 27 wherein said width of said first lead-out electrodes at said land is at least 200% of the width of said first lead-out electrodes at said contact face.

31. The multi-layer capacitor of claim 27 wherein said capacitor comprises a rectangular capacitor body and first polarity external electrodes on the exterior of said capacitor body wherein said first polarity external electrodes are in electrical contact with said lead-out electrodes.

32. The multi-layer capacitor of claim 31 wherein said capacitor body is square.

33. The multi-layer capacitor of claim 27 wherein at least one first polarity external electrode of said first polarity external electrodes is across said capacitor body from a second polarity external electrode of said second polarity external electrodes.

34. The multi-layer capacitor of claim 27 wherein at least one first polarity external electrode of said first polarity external electrodes is across said capacitor body from a second polarity external electrode of said second polarity external electrodes.

35. The multi-layer capacitor of claim 27 wherein said first polarity external electrodes and said second polarity external electrodes alternate over at least a portion of said capacitor body.

36. The multi-layer capacitor of claim 35 wherein said first polarity external electrodes and said second polarity external electrodes alternate around a periphery of said capacitor body.

37. A multi-layer capacitor comprising:
   a monolithic capacitor body comprising first polarity external electrodes and second polarity external electrodes on an exterior of said body;
   a first internal electrode comprising first lead-out electrodes and lands between said first lead out electrodes wherein said first lead-out electrodes have a width at said land that is at least 150% of the width of said first lead-out electrodes at said face and said first lead out electrodes are in electrical contact with said first polarity external electrodes;
   a second internal electrode comprising second lead-out electrodes in contact with said second polarity external electrodes;
   said first internal electrode and said second internal electrode are in parallel spaced-apart relationship with a dielectric there between wherein said first lead-out electrodes are further than an arc distance from an external electrode of opposite polarity.

38. A multi-layer capacitor comprising internal electrodes having diverging lead-out electrodes and a dielectric there between wherein said lead-out electrodes have a non-linear divergence beyond said dielectric.

39. A multi-layer capacitor comprising internal electrodes having diverging lead-out electrodes and a dielectric there between wherein said diverging lead-out electrodes are further than an arc distance from an external electrode of opposite polarity and said diverging lead-out electrodes diverge beyond said dielectric.

40. A multi-layer capacitor comprising internal electrodes having diverging lead-out electrodes with a dielectric therebetween wherein said diverging lead-out electrodes diverge beyond said capacitor unit and wherein said capacitor comprises a rectangular capacitor body and external electrodes on the exterior of said capacitor body wherein said external electrodes are in electrical contact with said lead-out electrodes.

* * * * *